United States Patent [19]

Lee

[11] Patent Number: 5,891,597
[45] Date of Patent: Apr. 6, 1999

[54] PROCESS FOR MANUFACTURING A LIQUID CRYSTAL DISPLAY PANEL

[75] Inventor: Si-hyun Lee, Suwon, Rep. of Korea

[73] Assignee: Samsung Display Devices Co., Ltd., Kyungki-do, Rep. of Korea

[21] Appl. No.: 742,761

[22] Filed: Nov. 1, 1996

[30] Foreign Application Priority Data

Nov. 24, 1995 [KR] Rep. of Korea .................. 1995-43676
Nov. 24, 1995 [KR] Rep. of Korea .................. 1995-43681

[51] Int. Cl.$^6$ ............................ G02B 5/20; G02F 1/1335
[52] U.S. Cl. ................. 430/7; 430/321; 216/23; 216/24; 216/39
[58] Field of Search .......................... 430/7, 321; 216/23, 216/24, 39; 349/106

[56] References Cited

U.S. PATENT DOCUMENTS 5,201,268  4/1993  Yamamoto et al. .
5,348,828  9/1994  Murata et al. .

FOREIGN PATENT DOCUMENTS

| 0702 250 A2 | 3/1996 | European Pat. Off. . |
| 59-084206 | 5/1984 | Japan . |
| 62-067502 | 3/1987 | Japan . |
| 4-039603 | 2/1992 | Japan .................................... 430/20 |
| 6-202122 | 6/1994 | Japan . |

*Primary Examiner*—John A. McPherson
*Attorney, Agent, or Firm*—Leydig, Voit & Mayer

[57] ABSTRACT

A liquid crystal display panel and manufacturing process thereof are provided. The liquid crystal display panel comprises a transparent substrate having a plurality of grooves, color filters of red, green and blue formed in the said grooves of the transparent substrate, a protective film formed on said color filters, and an electrode layer formed atop said protective film. A liquid crystal display panel having improved color reproduction and color characteristic can be obtained.

10 Claims, 11 Drawing Sheets

PROCESS FOR MANUFACTURING A LIQUID CRYSTAL DISPLAY PANEL

TECHNICAL FIELD

The present invention relates to a liquid crystal display panel and a process for manufacturing the same, and more particularly, to a liquid crystal display panel having a wide color reproduction range and good color characteristics, by employing a color filter with good planarity, and a process for manufacturing the liquid crystal display panel.

BACKGROUND OF THE INVENTION

A liquid crystal display enjoys a lighter weight and smaller size than a display using a cathode ray tube, and thus it is conveniently portable. Further, it has the advantage of not radiating an electromagnetic wave which is considered harmful to humans. Therefore, the liquid crystal display is widely used for small displays (e.g., of an electronic calculator) and large displays (e.g., of a notebook computer).

A structure of the conventional liquid crystal display panel is shown in FIG. 1. Referring to FIG. 1, a process for manufacturing such a liquid crystal display panel will be described.

Black matrixes 15 are formed on a glass substrate 11, and a red filter 16, a green filter 17, and a blue filter 18 are, respectively, formed between the black matrixes 15. The combination of the black matrixes 15, red filter 16, green filter 17, and blue filter 18 is commonly referred to as a color filter layer. To planarize the color filter layer and to enhance chemical resistance, a protective film 13 is formed thereon, and an indium-tin oxide (ITO) electrode layer 14 is then formed on the protective layer 13.

When forming the red, green, and blue filters, a red coloring resin composition is first coated on the whole surface of the substrate 11 having black matrixes 15 formed therein, which is exposed through a photo mask and then developed, to produce the red filter 16. The above procedure is repeated for green and blue, which produces, respectively, the green and blue filters 17 and 18.

A general photosensitive coloring resin composition includes a binding resin, pigments, a dispersing agent, a photo-polymerizable monomer, a photo-polymerization initiator, dilution solvents and additives. Such photosensitive coloring resin composition can be obtained according to the following procedure.

First, binding resin and pigment are mixed with dispersing agent, such that the pigment is sufficiently dispersed into the resin. Then, the photo-polymerizable monomer and photo-polymerization initiator are added, to form a mixture. Finally, the mixture is diluted with solvent, to form a photosensitive coloring resin composition.

When a liquid crystal display panel is manufactured by the above procedure, since the coloring resin composition is coated on the whole surface of the substrate, the coloring resin composition is used for an undesired portion of the substrate, thus, greatly lowering the utility of a material. Also, in the photosensitive coloring resin composition for the color filter, since the ratio of photosensitizer and bonding resin amounts to more than 50%, the ratio of pigment is rather low.

On the other hand, the protective film is generally disposed between the color filter layer and ITO electrode layer. Before and after the protective film formation, a grinding process in which the whole surface of the substrate is planarized should be accomplished.

As above, the process for manufacturing the conventional liquid crystal display panel is complicated, and the thus-obtained liquid crystal display panel has a narrow color reproduction range and poor color characteristics.

SUMMARY OF THE INVENTION

An object of the present invention is to provide a liquid crystal display panel having a wide color reproduction range and good color characteristics, by employing a color filter with good planarity, without a separate grinding process.

Another object of the present invention is to provide a suitable process for manufacturing the above liquid crystal display panel.

The first object of the present invention is achieved by a liquid crystal display panel comprising:

a transparent substrate having a plurality of grooves;

color filters of red, green, and blue formed in the grooves of the transparent substrate;

a protective film formed on the color filters; and an electrode layer formed atop the protective film.

The second object of the present invention is achieved by a liquid crystal display panel comprising:

a transparent substrate having a plurality of grooves;

a color filter layer having black matrixes and color filters of red, green and blue formed in the grooves of the transparent substrate;

a protective film formed on the color filter layer; and an electrode layer formed atop the protective film.

It is preferable that the etching depth of the transparent substrate does not exceed one fifth of the depth of the transparent substrate so that there is no haze on the transparent substrate and the thus-obtained color filter has good transmittance and color characteristics.

The third object of the present invention is achieved by a process for manufacturing a liquid crystal display panel comprising the steps of:

forming a photoresist layer on a transparent substrate, exposing and developing the predetermined portion thereof to form a photoresist pattern, and then etching the transparent substrate by using the photoresist pattern, to form a plurality of grooves;

removing the photoresist pattern, and then adding a red coloring resin composition to the grooves, to form a red filter;

repeating the above steps for green and blue color resin compositions, to form a green color filter and a blue filter, respectively; and forming a protective film and an electrode layer on the color filters, in sequence.

The fourth object of the present invention is achieved by a process for manufacturing a liquid crystal display panel comprising the steps of:

forming a photoresist layer on a transparent substrate, exposing and developing the predetermined portion thereof to form a photoresist pattern, and then etching the transparent substrate by using the photoresist pattern, to form a plurality of grooves;

adding a red coloring resin composition to the grooves, to form a red filter;

exposing and developing the predetermined portion of the resulting photoresist layer to form a photoresist pattern, and etching the transparent substrate by using the photoresist pattern to form a plurality of grooves, and then adding a green coloring resin composition to form a green filter;

exposing and developing the predetermined portion of the resulting photoresist layer to form a photoresist pattern, and etching the transparent substrate by using the photoresist pattern, and then adding a blue coloring resin composition to form a blue filter;

removing the color filter and the photoresist pattern on the surface of the transparent substrate; and forming a protective film and an electrode layer on the surface of the resultant.

The fifth object of the present invention is achieved by a process for manufacturing a liquid crystal display panel comprising the steps of:

etching a transparent substrate with etching agent of a paste state, to form a plurality of grooves in the transparent substrate;

adding a red coloring resin composition to a part of the grooves and adding a photoresist to the rest of the grooves, exposing and then developing the resultant, to form a red filter;

repeating the above step for green and blue color resin compositions, to form a green filter and a blue filter, respectively; and forming a protective film and an electrode layer on the surface of the resultant, in sequence.

The sixth object of the present invention is achieved by a process for manufacturing a liquid crystal display panel comprising the steps of:

etching a transparent substrate with etching agent of a paste state, to form a plurality of grooves;

adding a red coloring resin composition to all grooves, exposing and then developing the resultant through a photo mask, to form a red filter;

repeating the above step for green and blue color resin compositions, to form a green filter and a blue filter, respectively; and forming a protective film and ITO electrode layer on the surface of the resultant, in sequence.

The thickness of the photoresist is preferably 1–1.5 $\mu$m.

When the coloring resin composition is provided to the grooves, a doctor blade coating method is used. Also, the glass substrate is etched with an etching solution such as a mixed solution of hydrochloric acid and hydrofluoric acid or by a sand blasting method. In the sand blasting method, the glass substrate is etched by spraying, for example, sand or alumina particles, onto the glass substrate under a constant pressure.

BRIEF DESCRIPTION OF THE DRAWINGS

The object of the invention will become more apparent by describing in detail a preferred embodiment of the present invention with reference to attached drawings in which.

DETAILED DESCRIPTION OF THE INVENTION

Figure 1:
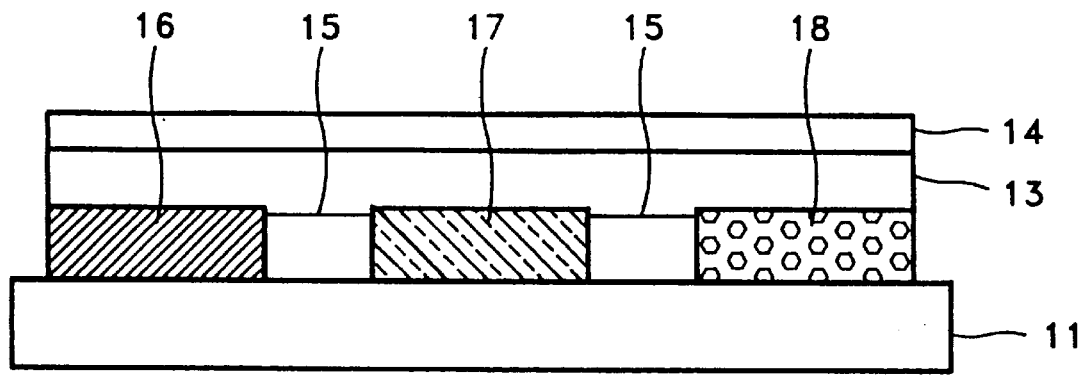
FIG. 1 illustrates the structure of a liquid crystal display panel according to the prior art.
Figure 2:
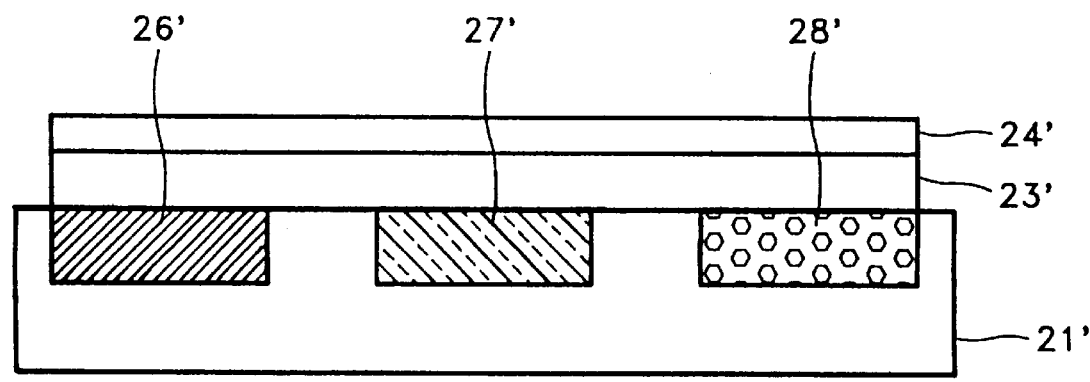
FIGS. 2–3 illustrate the structure of a liquid crystal display panel according to the present invention.
Figure 3:
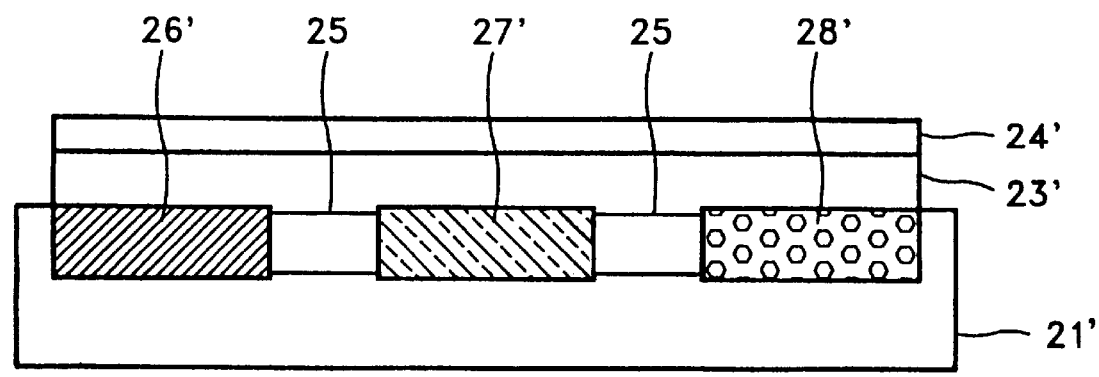

FIGS. 2–3 illustrate the structure of a liquid crystal display panel according to the present invention.

Referring to FIG. 2, a red, a green and a blue color filter 26', 27' and 28' respectively, are formed in the grooves of the transparent substrate 21'. Here, the upper surface of the color filters is at the same level of the surface of the transparent substrate 21'.

A protective film 23' and an electrode layer 24' are formed on the red, green and blue color filters 26', 27' and 28', in sequence.

Also black matrixes are formed on an other substrate having an opposite electrode layer (not shown).

In the liquid crystal display shown in FIG. 3, black matrixes 25 are formed between the color filters 26', 27', and 28'.

FIGS. 4A–4F show the process for manufacturing the liquid crystal display panel according to one embodiment of the present invention. In this process, a plurality of grooves are formed in a glass substrate by photolithography, and a coloring resin composition is added to the grooves, to form a color filter.

Figure 4A:
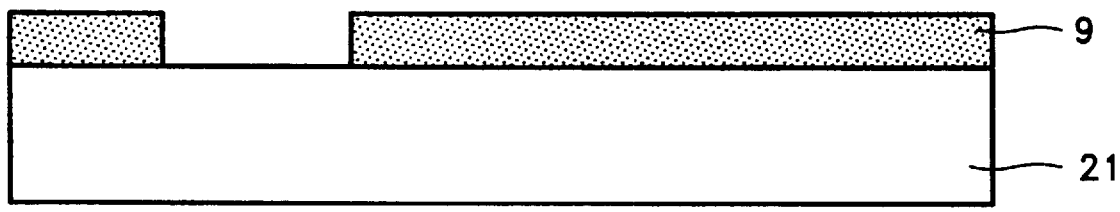
FIGS. 4A–4F are step-by-step diagrams showing a first process for manufacturing a liquid crystal display panel according to the present invention.
Figure 4B:
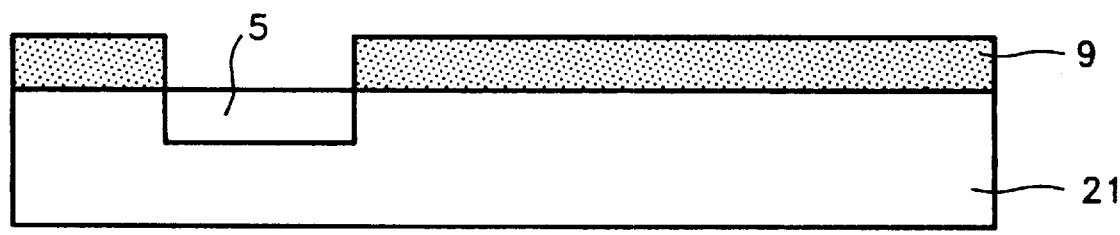

A photoresist layer 9 is formed on the glass substrate 21. Here, the thickness of the photoresist layer is preferably 1–1.5 $\mu$m. A predetermined portion of the photoresist layer 9 is exposed and developed, to form a photoresist pattern (FIG. 4A).

The glass substrate 21 is etched using the photoresist pattern and the mixed solution of hydrofluoric acid and hydrochloric acid (FIG. 4B) to form a groove. The etching depth depends on the ratio of hydrofluoric acid and hydrochloric acid in the etching solution and etching time. It is preferable that the etching depth is about 0.5–0.6 $\mu$m.

Figure 4C:
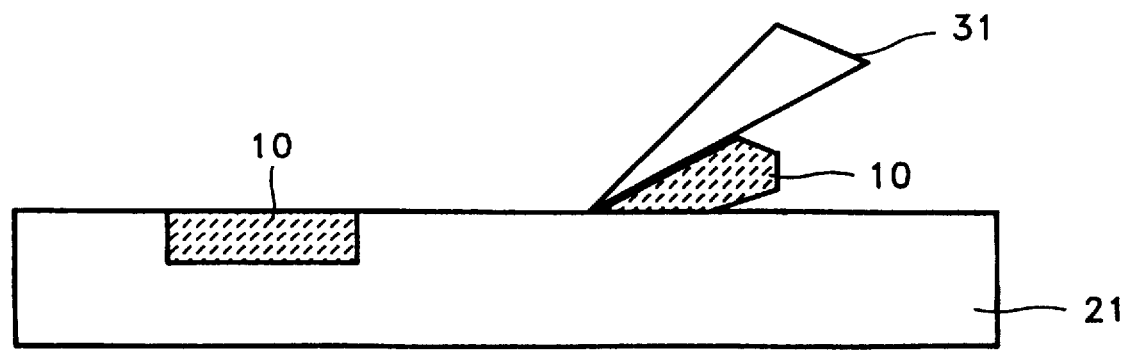

The photoresist pattern on the surface of the glass substrate 21 is completely removed. Then, a red coloring resin composition 10 is added to a groove 5 by using a doctor blade 31, to form a red filter 26 (FIGS. 4C–4D).

Figure 4D:
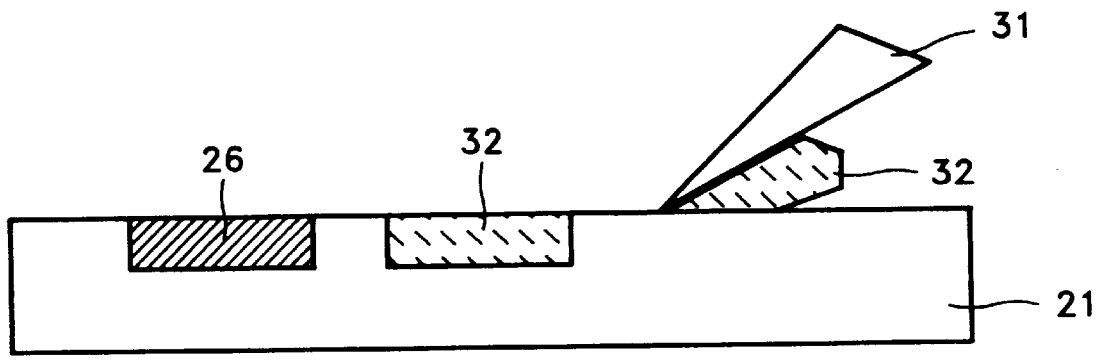
Figure 4E:
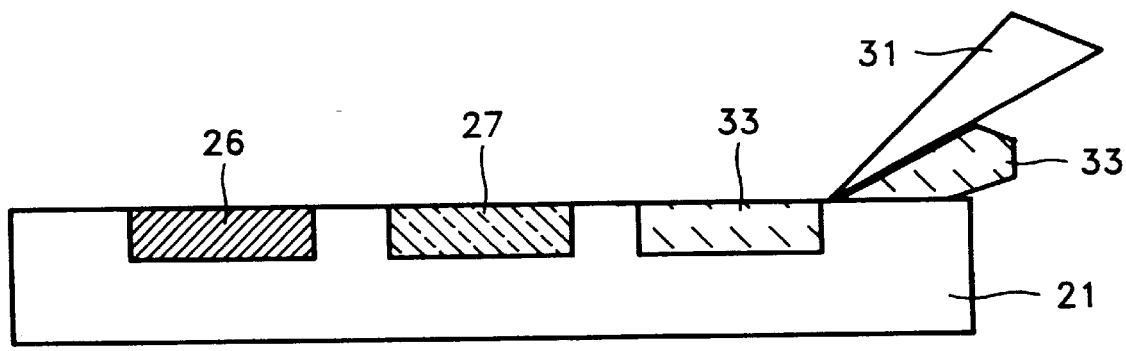
Figure 4F:
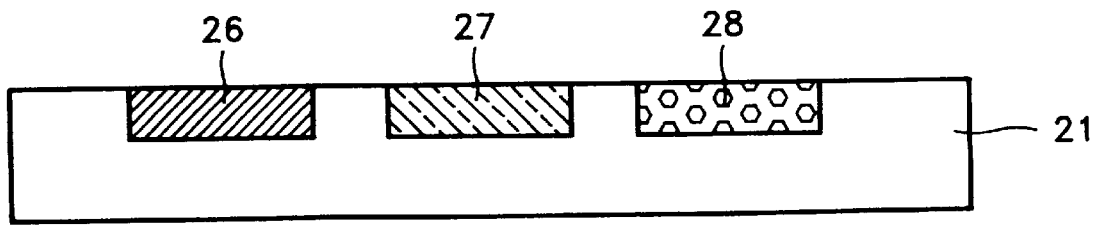

The above process is repeated with a green coloring resin composition 32 and a blue coloring resin composition 33 to form a green filter 27 and a blue filter 28, (FIGS. 4D–4F). Then, black matrixes are formed between the color filters in the same manner as the color filter formation, to form a color filter layer.

A protective film and an ITO electrode layer are formed on the surface of the resultant, in sequence, to thus produce the liquid crystal display panel shown in FIG. 2.

FIGS. 5A–5F show the process for manufacturing the liquid crystal display panel according to another embodiment of the present invention. In this process, the once-coated photoresist layer is continuously used, without the repetitious process of removing the photoresist layer and coating it again, before and after the color filter formation.

Figure 5A:
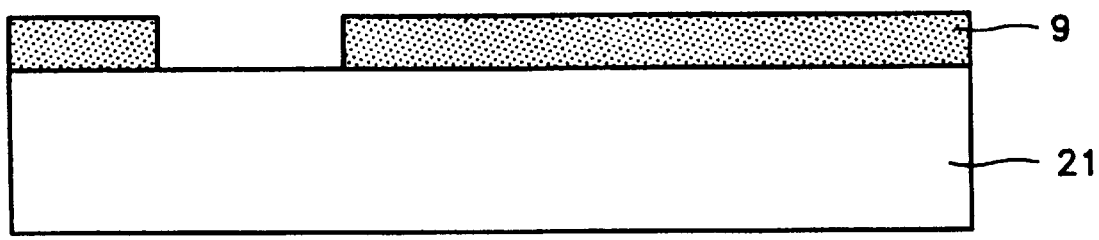
FIGS. 5A–5F are step-by-step diagrams showing a second process for manufacturing a liquid crystal display panel according to the present invention.
Figure 5B:
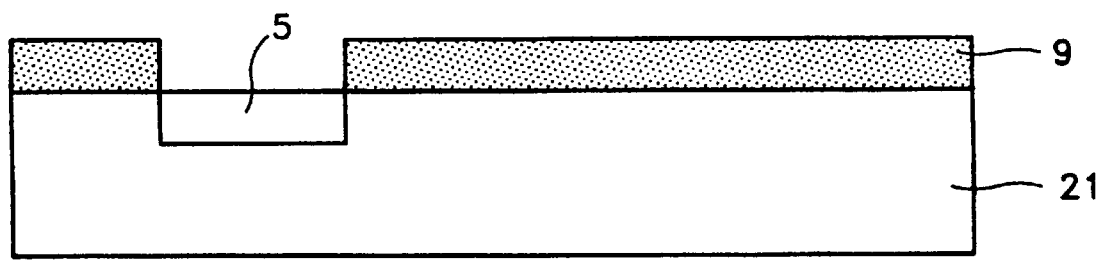

The photoresist layer 9 is first formed on the surface of the glass substrate 21. A predetermined portion of the photoresist layer 9 is exposed and developed, to form a photoresist pattern (FIG. 5A). The glass substrate 21 is etched by using the photoresist pattern and the mixed solution of hydrofluoric acid and hydrochloric acid, to form a groove 5 (FIG. 5B).

Figure 5C:
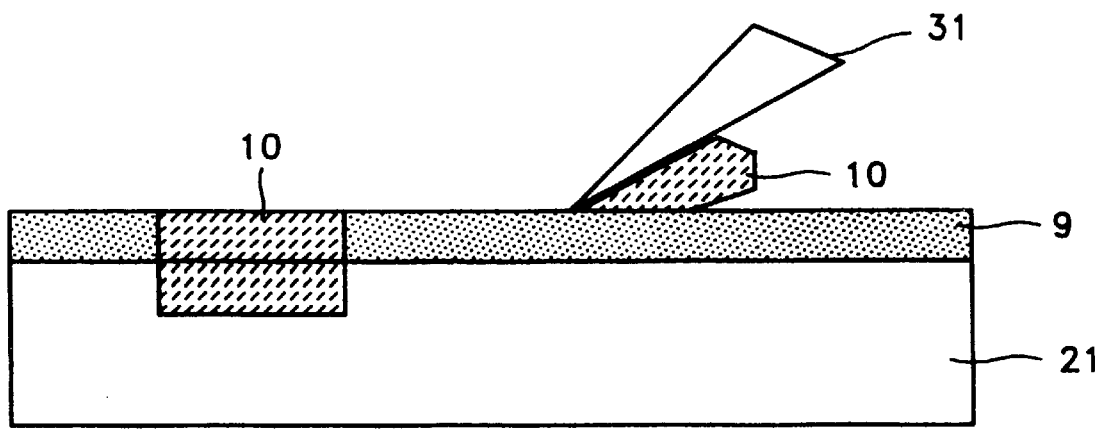
Figure 5D:
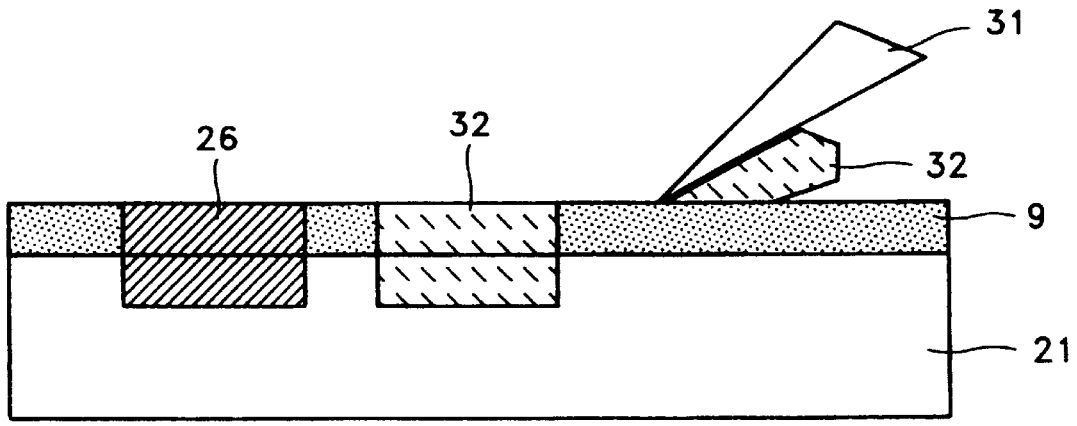

A red coloring resin composition 10 is added to the groove 5 by using the doctor blade 31, to form a red filter 26 (FIGS. 5C–5D).

Figure 5E:
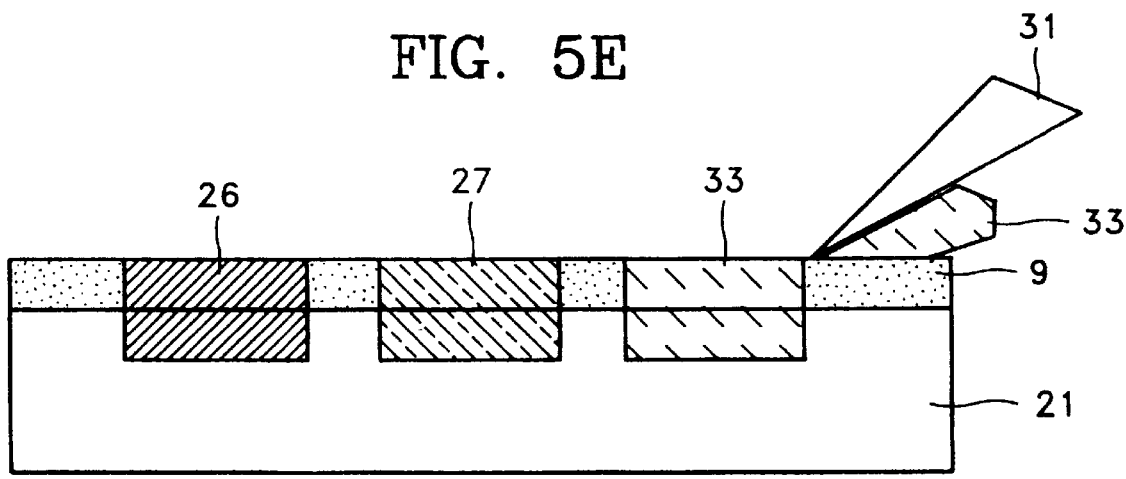

The predetermined portion of the photoresist layer is again exposed and developed to form grooves in the glass substrate, and then a green coloring resin composition 32 is added to the grooves to form a green filter 27 (FIGS. 5D–5E).

The above process is repeated for a blue color resin composition to form a blue filter 28 (FIG. 5E).

Figure 5F:
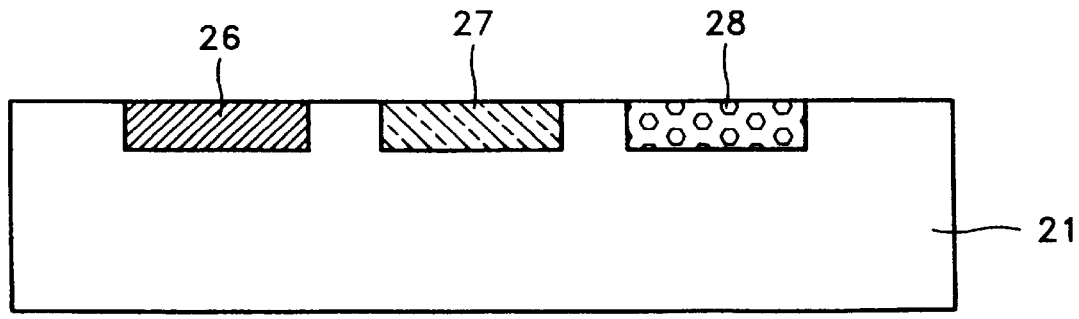

The color filter and the photoresist pattern on the surface of the glass substrate 21 are completely removed to form color filters 26, 27 and 28 (FIG. 5F). Then, black matrixes are formed between the color filters in the same manner as the color filter formation to form a color filter layer.

A protective film is formed on the color filter layer and an ITO electrode layer is formed atop the protective film to produce the liquid crystal display panel.

Figure 6A:
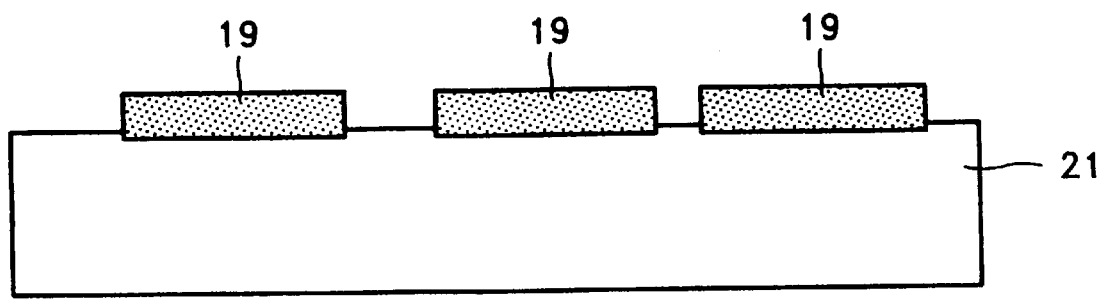
FIGS. 6A–6J are step-by-step diagrams showing a third process for manufacturing a liquid crystal display panel according to the present invention.
Figure 6B:
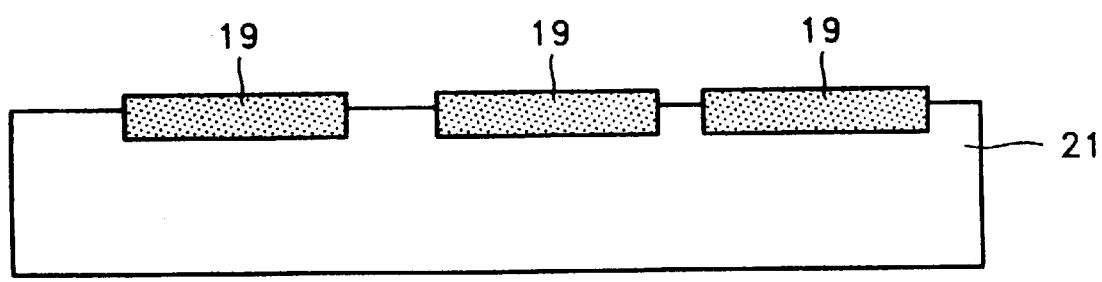
Figure 6C:
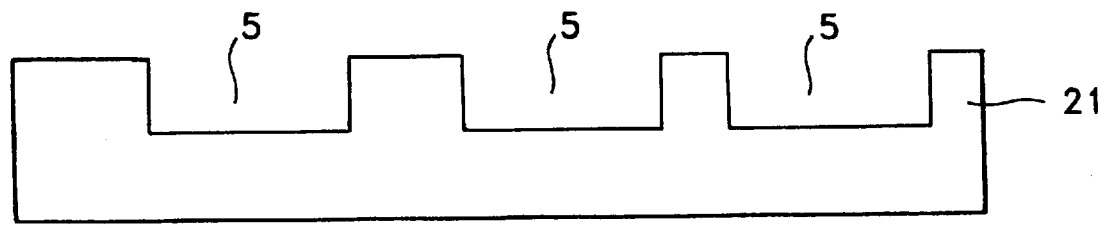

FIGS. 6A–6J show a process for manufacturing a liquid crystal display panel according to still another embodiment of the present invention, using a printing method. First, a plurality of grooves are formed in the glass substrate 21 using a printing method, such as screen printing or offset printing. The glass substrate is etched with an etching agent 19 in a paste state. After the etching, forming a plurality of grooves in the substrate 21, as illustrated in FIGS. 6A–6C, the substrate is washed. Three grooves so formed are illustrated in FIG. 6C.

Figure 6D:
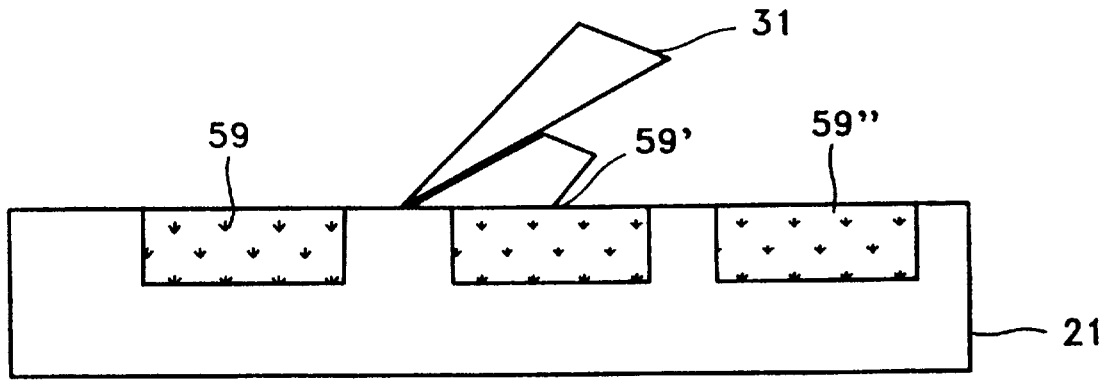
Figure 6E:
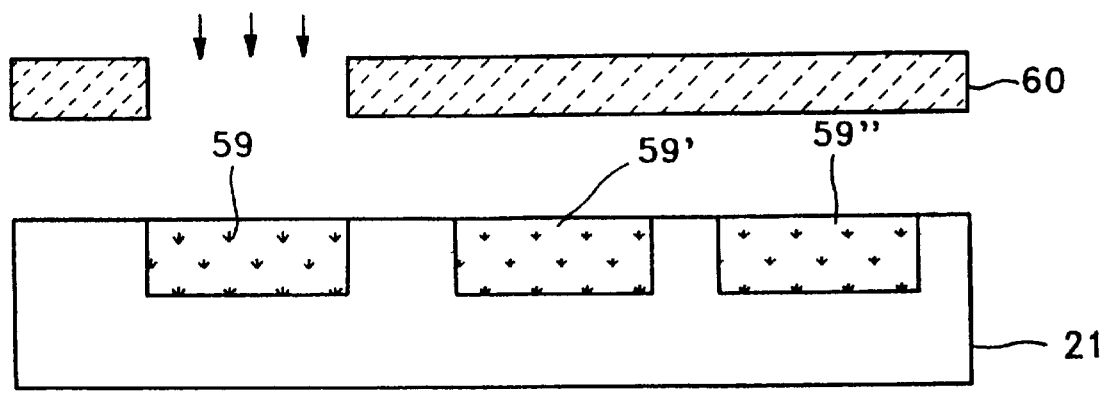
Figure 6F:
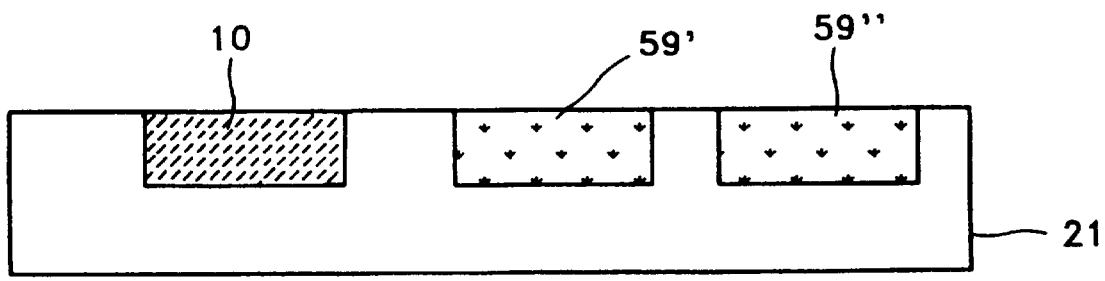

As shown in FIG. 6D, the grooves are filled with a photoresist, photoresist 59 in a first groove, 59' in a second groove, and 59" in a third groove. The photoresist 59 is selectively exposed using a photomask 60 illustrated in FIG. 6E as part of a process for forming a red filter 26. The exposed photoresist is developed and removed. Then, a red resin composition 10 is applied to the substrate and fills only the groove where the photoresist has been developed, for forming a color filter, as shown in FIG. 6F. The colored resin composition and the photoresist may be applied to the grooves using a doctor blade 31 as illustrated in FIG. 6D.

Figure 6G:
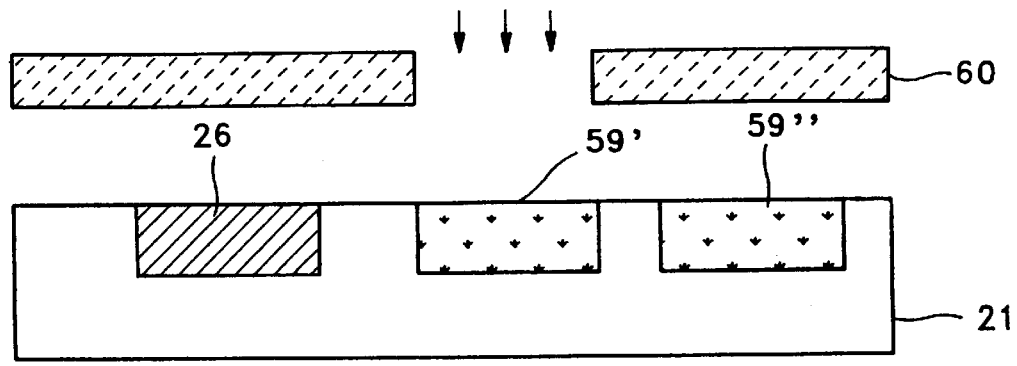
Figure 6H:
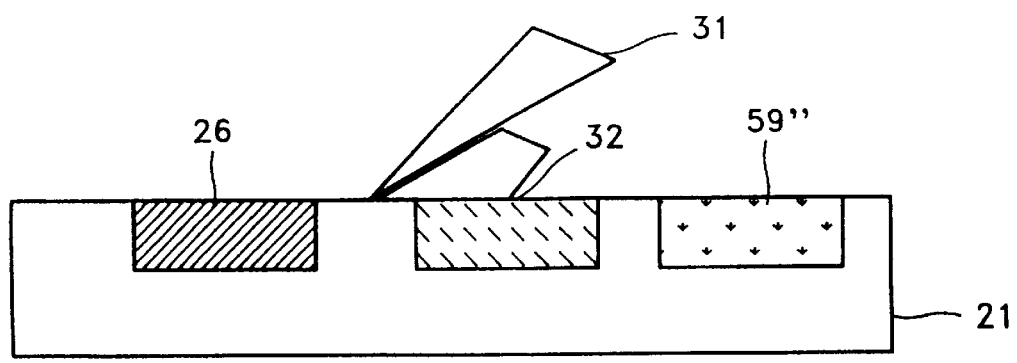
Figure 6I:
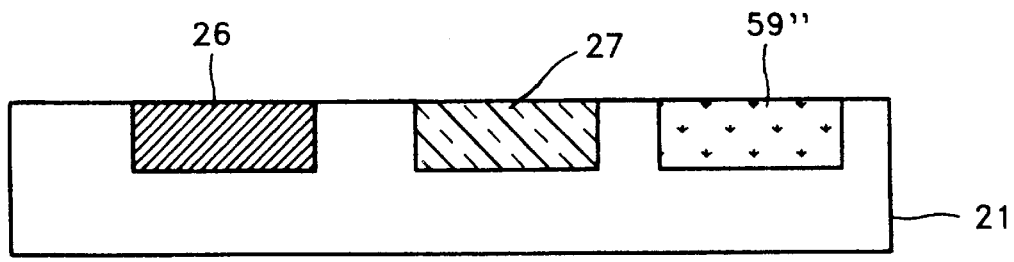
Figure 6J:
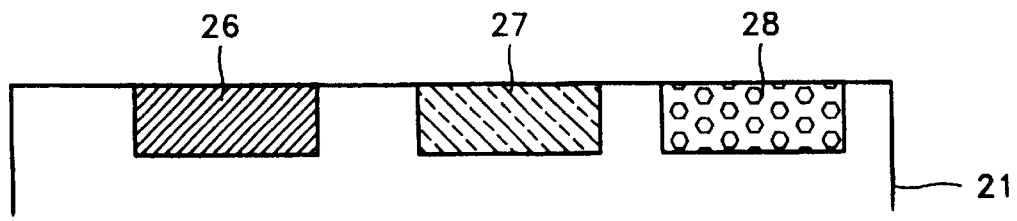

The same steps are employed to form green and blue filters. The photoresist 59' is selectively exposed, using the photomask 60 of FIG. 6E, and developed as illustrated in FIG. 6G. Then, a green resin composition 32 is applied so that the green resin composition fills only the grooves from which the photoresist has been removed in the preceding development process, thereby forming a green filter 27, as shown in FIG. 6H. Similarly, the photoresist 59" is removed by selective exposure and development and a blue resin composition is applied to fill the groove formerly filled by the photoresist 59". Thereby, the blue filter 28 is formed, as illustrated in FIG. 6J.

FIGS. 7A–7I show the process for manufacturing a liquid crystal display panel according to a further embodiment of the present invention by a printing method by the printing method.

Figure 7A:
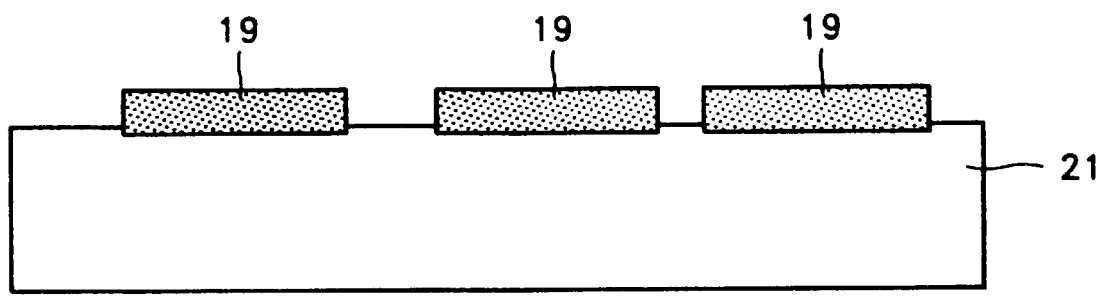
FIGS. 7A–7I are step-by-step diagrams showing a fourth process for manufacturing a liquid crystal display panel according to the present invention.
Figure 7B:
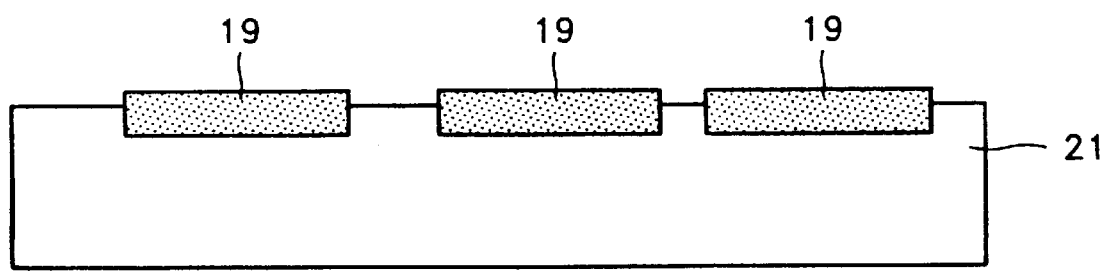
Figure 7C:
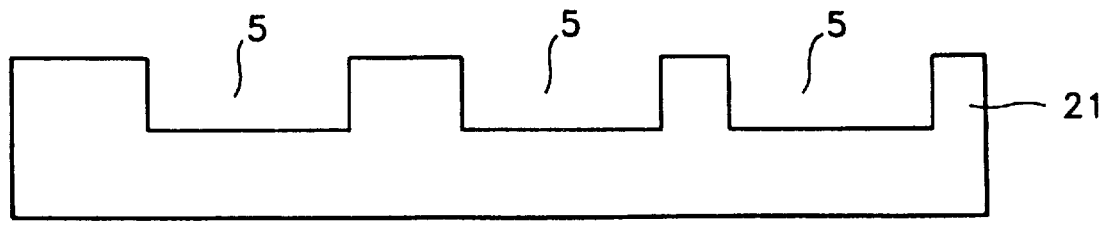

A plurality of grooves 5 are formed by using etching paste 19 in the same manner as the above process (FIGS. 7A–7C).

Figure 7D:
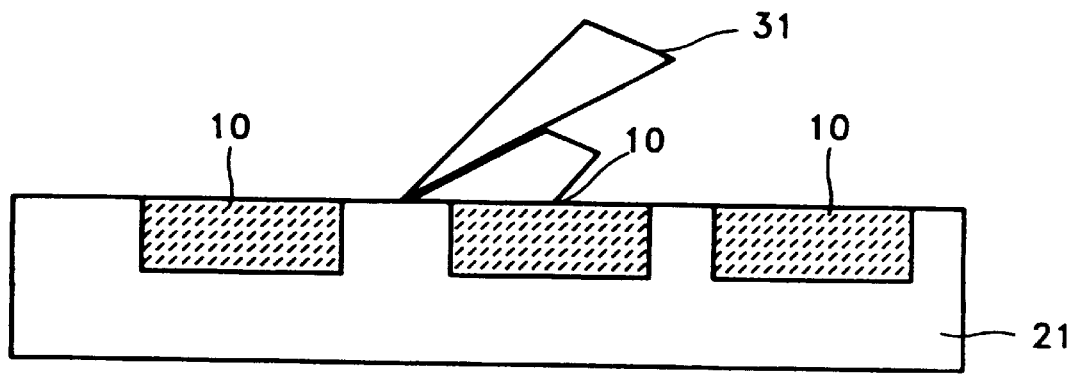
Figure 7E:
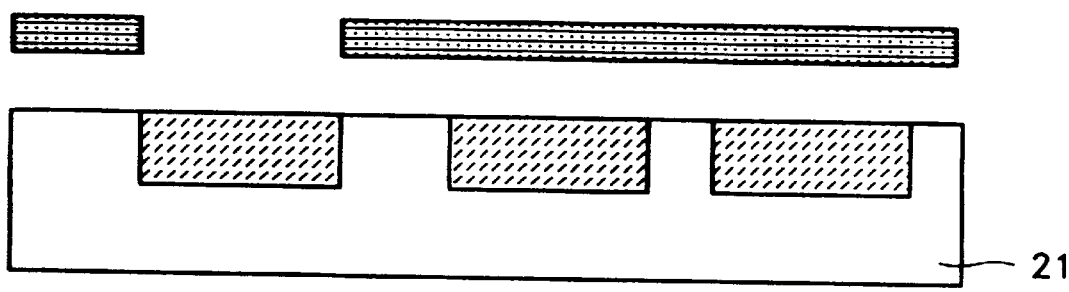
Figure 7F:
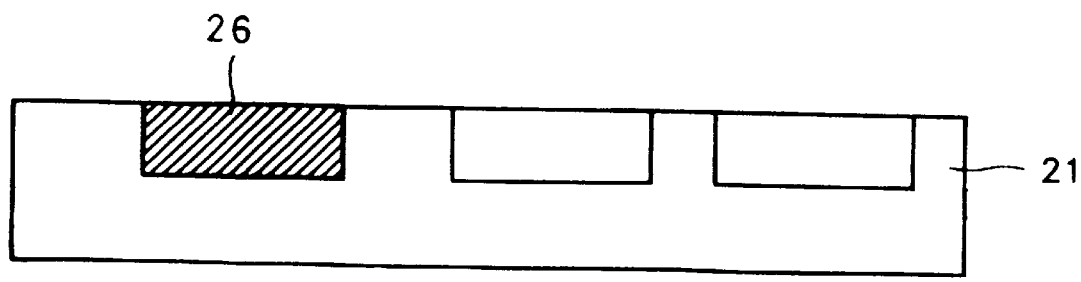
Figure 7G:
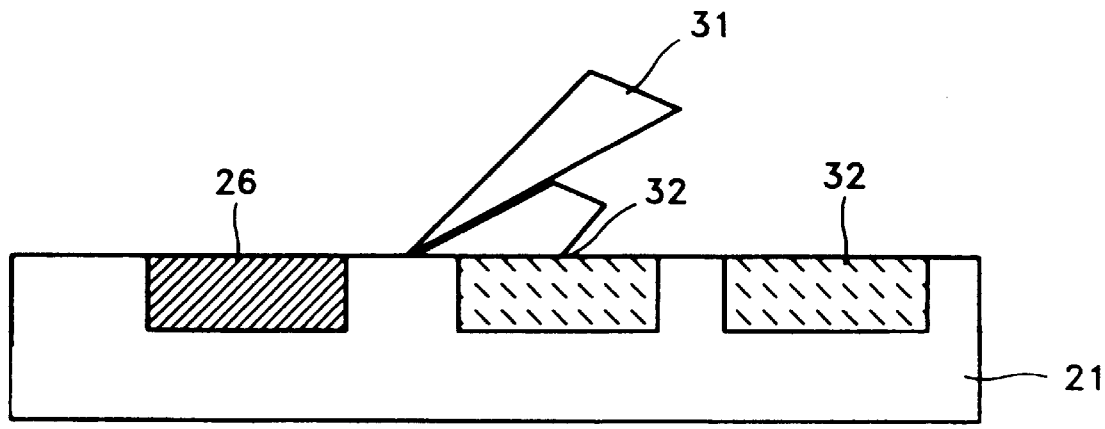
Figure 7H:
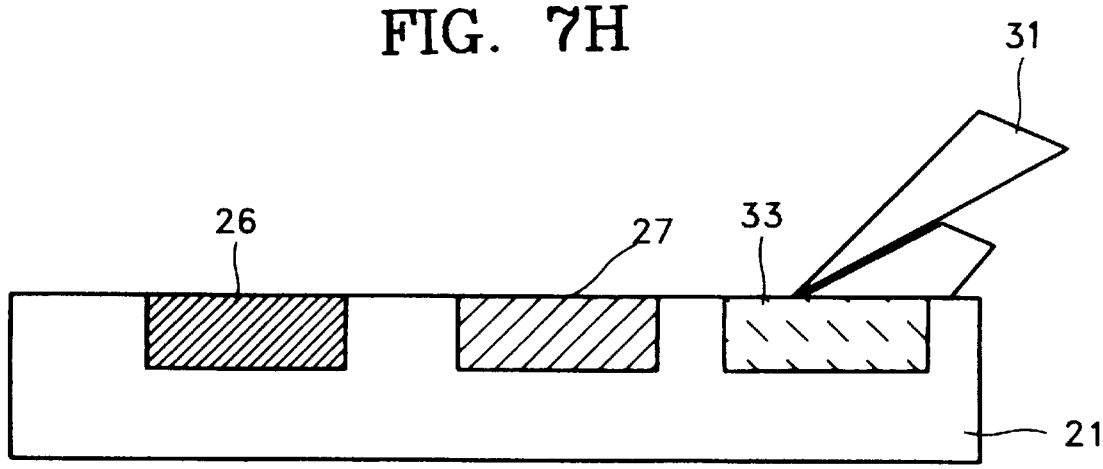
Figure 7I:
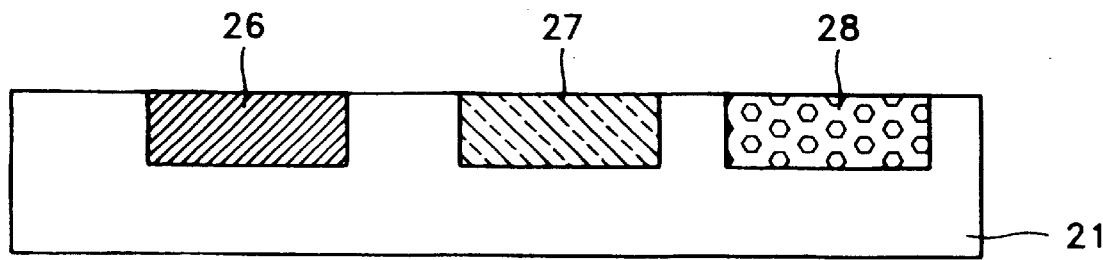

A red coloring resin composition 10 is added to all grooves (FIG. 7D). The resultant is exposed through the photo mask and then developed, to form a red filter 26 (FIGS. 7E–7F). Similarly, a green coloring resin composition 32 is added to all grooves (FIG. 7G). The resultant is exposed through the photo mask and developed, to form a green filter 27 (FIG. 7H). Then, the same process is repeated for blue color, to form a blue filter 28 (FIG. 7I).

The preferred example will now be referred to in connection with the comparative example but the present invention should not be limited to the following examples.

EXAMPLE 1

A photoresist layer was formed on the surface of a glass substrate to a thickness of about 1.2 $\mu$m. A predetermined portion of the photoresist layer was exposed and developed to form a pattern. Then, the glass substrate was etched with a mixed solution of hydrofluoric acid and hydrochloric acid to form grooves having a depth of about 0.6 $\mu$m.

The photoresist pattern on the surface of the glass substrate was removed. Then, a red coloring resin composition was added to the grooves, to form a red filter.

The red coloring resin composition included liotrogen red GD (Dongyang Ink Co. of Japan) as a red pigment, acrylate resin as a bonding resin, pentaerythritoltetraacrylate as a photo-polymerizable monomer and phthalocyanidine copper derivative as a dispersing agent.

The above process was repeated for green and blue color resin compositions, to form a green filter and a blue filter, respectively. Ionolgrin YS (Dongyang Ink Co. of Japan) was used as a green pigment, and ionolbul ES (Dongyang Ink Co. of Japan) was used as a blue pigment.

Black matrix were disposed between the color filters, to form a color filter layer. A protective film was formed on the color filter layer and then an ITO electrode layer was formed atop the protective film.

EXAMPLE 2

A glass substrate was etched by a screen printing method, to form grooves having a depth of about 0.6 $\mu$m. Here, a paste mixture of hydrofluoric acid and hydrochloric acid was used as an etching agent.

A red coloring composition including liotrogen red GD (Dongyang Ink Co. of Japan) as a red pigment, acrylate resin as a bonding resin, pentaerythritoltetraacrylate as a photo-polymerizable monomer and phthalocyanidine copper derivative as a dispersing agent was added to the grooves, which is exposed through a photo mask and developed to form a red filter.

The above process was repeated for green and blue colors, to form a green filter and a blue filter, in sequence. Here, ionolgrin YS (Dongyang Ink Co. of Japan) was used as the green pigment, and ionolbul ES (Dongyang Ink Co. of Japan) was used as the blue pigment.

Black matrix were formed between the color filters, to form a color filter layer. A protective film was formed on the color filter layer, and then an ITO electrode layer was formed atop the protective film.

COMPARATIVE EXAMPLE

A color filter layer having a black matrix and a color filter was formed on a glass substrate by usual method. Except that the coloring resin composition contained a low ratio of acrylate resin, photo-polymerizable monomer or dispersing agent to pigment, the same composition as Examples 1 and 2 was used as the coloring resin composition.

The planarity of the color filter layer and utility of a material of the Example 1 and comparative example were measured. Here, planarity of the color filter layer is defined as a thickness variation of the color filter layer.

As the result, while the planarity of the color filter layer of the comparative example was about 0.1 $\mu$m and the utility of a material was about 10%, the planarity of the color filter layer of the Example 1 was about 0.01–0.02 $\mu$m and the utility of a material was about 90%.

As can be seen from the above, there is a great difference in the utility of a material between Example 1 and comparative example. That is, in the comparative example, the coloring resin composition of the respective color was coated on the whole surface of the substrate in order to form a color filter layer, and on the contrary, in the Example 1, the coloring resin composition of the respective color was selectively added to the grooves in the glass substrate to form the color filter layer. Thus, the utility of a material of color filter layer in the Example 1 was much larger than that of the comparative example.

Further, the ratio of a bonding resin or photosensitizer to a pigment in a coloring resin composition of Examples 1 and 2 was considerably lower than that of the comparative example. Accordingly, color reproduction and the color characteristics of the liquid crystal display panel in the Examples 1 and 2 became better than that of the comparative example.

According to the present invention, since the green filter, blue filter and red filter are formed in the glass substrate so that the surface of the glass substrate is at the same level of the upper surface of the color filter layer, the utility of a material and the planarity of the color filter layer are improved. Also, in the coloring resin composition for the color filter, since the ratio of the photosensitizer or bonding resin to the pigment is remarkably small, the color reproduction and color characteristic of the liquid crystal display panel are enhanced.

What is claimed is:

1. A process of manufacturing a liquid crystal display panel comprising:

forming a photoresist layer on a transparent substrate, exposing and developing a portion of said photoresist layer to form a photoresist pattern, and then etching said transparent substrate using said photoresist pattern to form a first groove in said transparent substrate;

supplying a red color resin composition to the first groove to form a red filter;

exposing and developing said photoresist pattern to form a second photoresist pattern, and etching said transparent substrate using said second photoresist pattern to form a second groove in said transparent substrate, and then supplying a green color resin composition to the second groove to form a green filter;

exposing and developing said second photoresist layer to form a third photoresist pattern, and etching said transparent substrate using said third photoresist pattern to form a third groove in said transparent substrate, and supplying a blue color resin composition to said third groove to form a blue filter;

removing said third photoresist pattern and said red, green, and blue color filters outside the first, second, and third grooves from said transparent substrate;

disposing a protective film on said transparent substrate; and disposing an electrode on said protective film.

2. The process for manufacturing a liquid crystal display panel as claimed in claim 1, wherein said photoresist layer is 1–1.5 μm thick.

3. The process for manufacturing a liquid crystal display panel as claimed in claim 1, includng etching said transparent substrate to form the grooves to a depth not exceeding one fifth of the thickness of said transparent substrate.

4. The process for manufacturing a liquid crystal display panel as claimed in claim 1, using a doctor blade to supply the resin compositions to the first, second, and third grooves.

5. The process for manufacturing a liquid crystal display panel as claimed in claim 1, including etching said transparent substrate with a mixture of hydrofluoric acid and hydrochloric acid to form the grooves in the transparent substrate.

6. The process for manufacturing a liquid crystal display panel as claimed in claim 1, including etching said transparent substrate by sand blasting.

7. A process of manufacturing a liquid crystal display panel comprising:

etching a transparent substrate with a paste etching agent to form first, second, and third grooves in said transparent substrate;

supplying a photoresist to the first, second, and third grooves in said transparent substrate;

selectively exposing the photoresist in the first groove using a photomask and then developing the photoresist in the first groove;

supplying a first color resin composition to the first groove to form a first color filter;

selectively exposing the photoresist in the second groove using a photomask and then developing the photoresist in the second groove; and supplying a second color resin composition to the second groove to form a second color filter;

selectively exposing the photoresist in the third groove using a photomask and then developing the photoresist in the third groove; and supplying a third color resin composition to the third groove to form a third color filter.

8. The process for manufacturing a liquid crystal display panel as claimed in claim 7, including using a doctor blade to supply the first, second, and third resin compositions to the first, second, and third grooves.

9. The process for manufacturing a liquid crystal display panel as claimed in claim 7, including etching said transparent substrate to form the first, second, and third grooves to a depth not exceeding one fifth of the thickness of said transparent substrate.

10. The process for manufacturing a liquid crystal display panel as claimed in claim 7, including etching said transparent substrate with a mixture of hydrofluoric acid and hydrochloric acid to form the first, second, and third grooves.

* * * * *